(12) United States Patent
Kanzler (10) Patent No.: US 6,975,458 B1
(45) Date of Patent: Dec. 13, 2005

(54) METHOD AND APPARATUS FOR TRANSFORMATION OF A GAUSSIAN LASER BEAM TO A FAR FIELD DIFFRACTION PATTERN

(76) Inventor: Kurt Kanzler, 949 Santa Ynez Way, Sacramento, CA (US) 95816

( * ) Notice: Subject to any disclaimer, the term of this patent is extended or adjusted under 35 U.S.C. 154(b) by 0 days.

(21) Appl. No.: 10/194,656

(22) Filed: Jul. 12, 2002

Related U.S. Application Data (60) Provisional application No. 60/305,472, filed on Jul. 13, 2001.

(51) Int. Cl.[7] .............................. G02B 5/18; H01S 3/08
(52) U.S. Cl. ..................... 359/571; 359/569; 359/566; 372/98; 372/103
(58) Field of Search ............................... 359/565, 566, 359/569, 571, 573, 575; 372/96, 103, 102, 372/98; 356/237

(56) References Cited

U.S. PATENT DOCUMENTS

| | | | |
|---|---|---|---|
| 3,407,294 A | | 10/1968 | Hill |
| 3,843,239 A | | 10/1974 | Tsunoda et al. |
| 3,909,744 A | | 9/1975 | Wisner et al. |
| 4,127,828 A | | 11/1978 | Klauminzer |
| 4,143,937 A | | 3/1979 | Yojnezawa et al. |
| 4,410,237 A | | 10/1983 | Veldkamp |
| 4,465,371 A | * | 8/1984 | Pernick ..................... 356/237 |
| 4,810,047 A | | 3/1989 | Pernick |
| 4,835,088 A | | 5/1989 | Gilson |
| 5,148,317 A | * | 9/1992 | Foresi ........................ 359/566 |
| 5,524,018 A | * | 6/1996 | Adachi ........................ 372/98 |
| 5,713,364 A | | 2/1998 | DeBaryshe et al. |
| 5,786,582 A | | 7/1998 | Roustaei et al. |
| 5,982,806 A | * | 11/1999 | Yamaguchi et al. ........ 372/103 |
| 6,008,941 A | | 12/1999 | Feldman et al. |
| 6,133,986 A | | 10/2000 | Johnson |
| 6,144,791 A | | 11/2000 | Wach et al. |
| 6,167,016 A | | 12/2000 | Block et al. |

OTHER PUBLICATIONS

Dickey, F.M. et al.; "Gaussian Laser Beam Profile Shaping," Opt Eng., vol. 35, No. 11, pp. 3285-3295, (1996).
Leger, J.R. et al.; "Laser Beam Relaying with Phase-Conjugate Diffractive Optical Elements," App. Opt., vol. 36, No. 20, pp. 4749-4755, (1997).
Borek, G. et al.; "High Performance Diffractive Optics for Beam Shaping," SPIE Proceedings, OE3633-06, pp. 1 thru 10, San Jose, CA, Jan., 1999.
Dickey, Fred M., Holswade, Scott C. eds.; Laser Beam Shaping-Theory and Techniques, Marcel Dekker, Chapter 6, pp. 252, (2000), New York.
Moller, K.D.; :"OPTICS," Chapter 8, 'Physical Properties of Gaussian Beams,' pp. 338, University Science Books, (1988), Mill Valley, CA.
Gori, F.; "Flattened Gaussian Beams," OPT. Comm., vol. 107, pp. 335-341, (1994).
Siegman, A.E.; "LASERS," Chapter 17, pp. 663 thru 697, University Science Books, (1986), Mill Valley, CA.
Johnston, T.F., Jr.; "M Squared Concept Characterizes Beam Quality," Laser Focus World, pp. 1-8, May, 1990.
Veldkamp, W.B.; "Laser Beam Profile Shaping with Binary Diffraction Gratings," Opt. Comm. vol. 38, No. 5 & 6, pp. 381-386, (1981).

* cited by examiner

Primary Examiner—Audrey Chang
(74) Attorney, Agent, or Firm—John P. O'Banion (57) ABSTRACT

A method and apparatus for converting a Gaussian laser beam into a propagating far field diffraction pattern using an off-axis diffractive optic. This propagating far field pattern is focused by a lens to obtain a flattop intensity at the focal plane. The technique is based on the idea of Fourier transform pairs and produces a small spot diameter with a useable depth of field. A focused uniform intensity profile can be useful for many laser applications.

14 Claims, 8 Drawing Sheets

METHOD AND APPARATUS FOR TRANSFORMATION OF A GAUSSIAN LASER BEAM TO A FAR FIELD DIFFRACTION PATTERN

CROSS-REFERENCE TO RELATED APPLICATIONS

This application claims priority from U.S. provisional application Ser. No. 60/305,472 filed on Jul. 13, 2001, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

The present invention pertains generally to transforming a Gaussian laser beam to a far field diffraction pattern, and more particularly to employing an off-axis blazed diffractive phase grating to shape a Gaussian beam to a non-Gaussian intensity shape at some small diffracted angle for a single diffraction order and transforming the intensity shape to its far field pattern in one or two dimensions.

2. Description of the Background Art

Since the time that the laser was invented and employed in labs around the world, scientists have been proposing and experimenting with various beam shaping schemes. For example, the fundamental Gaussian $TEM_{00}$ profile has great flexibility and utility in many applications. However, without intensity profile shaping as a degree of freedom for design engineers, many applications cannot be realized with sufficient quality. Furthermore, the high cost of early beam shaping techniques limited their practical use. With the recent development of highly efficient diffractive optics, however, beam-shaping techniques are being refined. Diffractive efficiencies greater than 90% and minimal degradation of solutions due to manufacturing tolerances allow beam shaping to be performed at a reasonable cost.

A substantial amount of work has been performed over the past twenty years in the area of beam shaping using diffractive optics. Most of this work has centered around producing shaped beams and studying their free space propagation. A limited amount of work has been performed related to using beam shapers with conventional focusing schemes. The properties of focused beams are of paramount interest to a large portion of existing laser applications engineers.

One currently accepted method for obtaining a focused flattop (uniform) intensity is to shape a Gaussian beam with a diffractive optic and then use a refractive lens to produce the focus. This method has been shown to produce flattop intensity at some intermediate plane, rather than the focal plane of the lens. At the focus of the lens, the Fourier transform of the input intensity is produced. Depending on the design parameters, another intensity pattern (non-uniform) is obtained at the focus. This method has been shown by Dickey et al. (Dickey, F. M. et al., "Gaussian laser beam profile shaping," Opt. Eng. 35(11), pp. 3285–3295 (1996)) to produce a close to theoretical flattop using a $CO_2$ laser. Ledger et al. (Ledger, J. R. et al., "Laser beam relaying with phase conjugate diffractive optical elements," App Opt 36(20), pp. 4749–4755 (1997)) as well as Borek et al. (Borek, G. et al., "High performance diffractive optics for beam shaping," SPIE Proceedings 3633, San Jose, Calif., Jan. 1999) have also independently shown techniques for producing propagating flattop intensity profiles with laser beams using diffractive optics. These flattop propagation techniques used with a focusing lens construct an Airy pattern at the focal plane (Brown, D. R., "Laser Beam Shaping-Theory and Techniques," New York, Marcel Dekker, Chapter 6, p. 252 (2000)). While this Airy pattern at the focus may prove useful for some applications, in general the pattern is not desirable. If laser users desire to perform work with such a flattop profile, however, they are limited to a small depth of field with a spot diameter some factor larger than the lens can produce.

It will be appreciated that all simple lenses perform a Fourier transform on the input intensity function and that this transform is created at the focal plane of the lens. If a technique can be designed to propagate a far field pattern, and this far field pattern is focused, the Fourier transform will create a uniform intensity profile at the focal plane of the lens.

Fourier Transforms

Fourier optics theory is well documented and widely used in the field of optical engineering. The Fourier transform can be defined by:

$$F(\omega) = \int_{\infty}^{-\infty} f(x)e^{-i\omega x}dx \qquad (1)$$

Another useful property of Fourier transforms is the Inverse Theorem, which states $$f(x) = \frac{\pi}{2}\int_{\infty}^{-\infty} F(\omega)e^{i\omega x}d\omega \qquad (2)$$

The two functions f(x) and F(ω) can be thought of as Fourier transform pairs (Moller, K. D., "Optics", University Science Books, Chapter 8, p. 338 (1988)). These pairs can help to explain what type of intensity pattern we need to create in order to produce the other at the focus. A unique property of Gaussian functions is that they only change by a scale factor when they go through a Fourier transform, but remain in mathematical form. This is why a Gaussian laser beam will produce a Gaussian intensity profile at the focal plane of a lens, as well as propagate for a very long distance and retain its Gaussian intensity profile.

Figure 1:
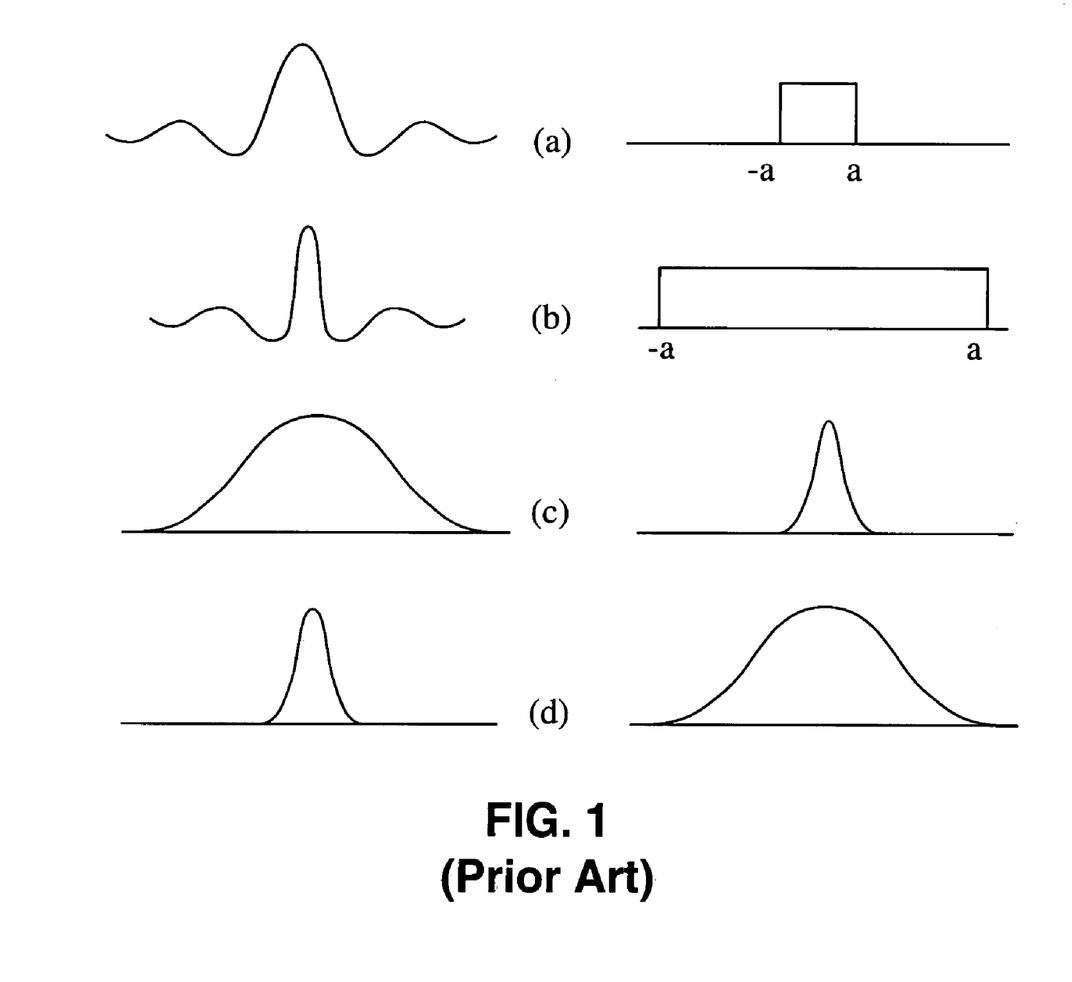
FIG. 1 is a series of graphs showing Fourier transform pairs.

Alternative intensity profiles such as flattops do not share this unique property and need to be handled differently from the familiar Gaussian. A pair of intensity profiles that cyclically reproduce each other when they are transformed can help to characterize these alternative profiled beams as shown in FIG. 1. FIG. 1(a) and FIG. 1(b) show sin Y/Y forms with different scaling factors and FIG. 1(c) and FIG. 1(d) show Gaussian forms with different scaling factors. A uniform profile can be described as the following:

$$P(x) = \begin{cases} 1 & \text{for } -a \le x \le a \\ 0 & \text{otherwise} \end{cases} \quad (3)$$

where a and −a are the boundaries of the uniform profile symmetric about x=0. The Fourier transform of P(x) can be shown to take the form of the familiar Sinc function of diffraction theory as follows:

$$S(\omega)=C(\sin Y)/Y \quad (4)$$

Since P(x) and S(ω) are a Fourier transform pair, they will reproduce each other when a transform operates on either function. Two of the simplest ways in which this transform will occur are (1) propagation over a large distance and (2) introducing a focusing element into the beam path.

Figure 2:
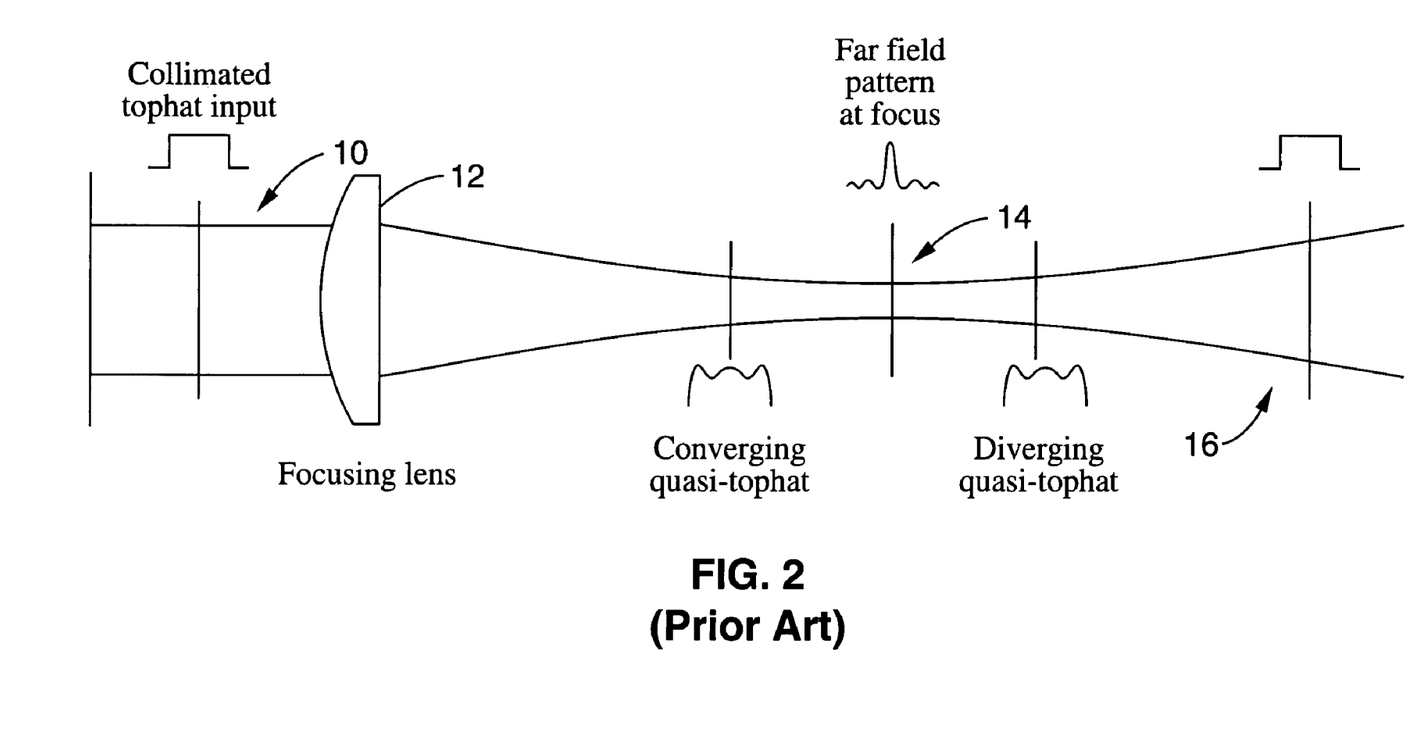
FIG. 2 is a schematic diagram showing a collimated tophat beam propagating through a lens.

FIG. 2 schematically illustrates what is happening as a uniform collimated tophat beam propagates through a lens. As this tophat beam 10 propagates past the lens 12, the intensity pattern starts to breakdown into higher frequency lobes. These higher frequency lobes gain relative intensity and move towards the edge of the beam profile, until they finally collapse into the single high peaked Sinc function at the focus 14. After the focus, the process begins to reverse and finally restores the uniform intensity as the wave front diverges to a large spot diameter 16.

The Fourier transform pair can be thought of as beginning and end points for the transform process; however, as the beam propagates from P(x) to S(ω) there are many intensity patterns realized along the way. Gori gives a comprehensive account of this propagation for "Flattened Gaussian beams" (Gori, F. "Flattened Gaussian beams," Opt. Comm. 107, pp. 335–341, 1994).

Gaussian Beam Focusing

Siegman discusses the basics of Gaussian beam focusing in detail (Siegman, A. E. "Lasers", University Science Books, Chapter 17, pp. 663–697 (1986)). When asking the question, "What is the focused spot diameter for a given Gaussian beam with a lens of given focal length?" the equation is given by $$W_1 W_f = f\lambda/\pi \quad (5)$$

where $W_1$ is the radius of the beam input at the lens aperture, $W_f$ is the radius of the spot at the focus, and f is the focal length of the lens. The above equation assumes a fundamental Gaussian mode. For higher order modes, where the $M^2$ is not equal to one, the focused spot will be a factor of $M^2$ times $W_f$ (Johnston, Jr., T. F., "$M^2$ concept characterizes beam quality", Laser Focus World, May 1990). $M^2$ is given by $$M^2 = \frac{\pi}{4}\Theta(2W_0)/\lambda \quad (6)$$

where (Θ) is the full angle divergence.

The next important parameter to discuss is the Rayleigh range, which is defined as the propagation distance that allows a round beam to double its area. It is given by $$Z_R = \pi W_0^2/\lambda \quad (7)$$

A word of caution is needed with regards to $Z_R$ for non-Gaussian beams. The Rayleigh range only contains information about the size of the beam and no information is given about the cross sectional beam profile. One could imagine a beam that is slowly diverging so that its Rayleigh range is long, but it is continually changing it's cross sectional intensity profile.

Several techniques exist to produce a propagating far field pattern with defined beam characteristics. One technique is to truncate a Gaussian beam with a very small aperture (amplitude grating) where a<<$W_0$. Over this small area the Gaussian beam is nearly uniform. The result is a textbook version of the diffraction pattern of a uniformly illuminated round aperture. If a lens is placed at one focal length distance from the pinhole, the far field pattern will propagate nearly collimated. This technique is straightforward and compact; however it suffers from one significant shortcoming, namely, very high energy loss. This technique is similar to using a Fresnel Zone plate to focus light where there is a minimum loss of about 90%. Another technique is to use a diffractive optics to shape a Gaussian beam into a propagating far field pattern directly (Veldkamp, W. B. "Laser beam profile shaping with binary diffraction gratings," Opt. Comm. 38(5, 6), pp. 381–386 (1981)). In U.S. Pat. No. 4,410,237, Veldkamp describes a related system comprising a Gaussian laser, an on-axis binary diffractive phase grating that combines several diffractive orders to shape a non-Gaussian intensity shape that transforms into its far field pattern by long distance propagation (where the grating is symmetric about the optical axis or linear), and at least one prism to compress or expand the shaped beam. Still another approach is described in U.S. Pat. No. 5,148,317 which shows a diffractive optical element for collimating and redistributing a Gaussian input beam.

BRIEF SUMMARY OF THE INVENTION

The present invention uses diffractive optics (e.g., phase grating) to shape a Gaussian beam into a propagating uniform intensity profile, and then uses at least one lens to transform it to a propagating far field pattern. The lens or lenses can be spherical or cylindrical. Use of a cylinder lens allows for shaping of one axis only. For one beam axis, the output of the diffraction grating can be used directly. For a second axis, a pair of cylinder lenses can be used to transform the beam into its far field pattern and then focus into a line.

In general terms, an apparatus according to the present invention comprises a Gaussian laser with a $TEM_{00}$ fundamental mode; an off-axis blazed diffractive phase grating that shapes the Gaussian beam to a non-Gaussian intensity shape at some small diffracted angle for a single diffraction order, wherein the grating is asymmetric about the optical axis and wherein the grating is further asymmetric about an axis perpendicular to the optical axis; and at least one refractive cylinder or spherical lens to transform the intensity shape to its far field pattern in one dimension or two dimensions, respectively.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 3 through FIG. 8. It will be appreciated that the apparatus may vary as to configuration and as to details of the parts, and that the method may vary as to the specific steps and sequence, without departing from the basic concepts as disclosed herein.

Figure 3:
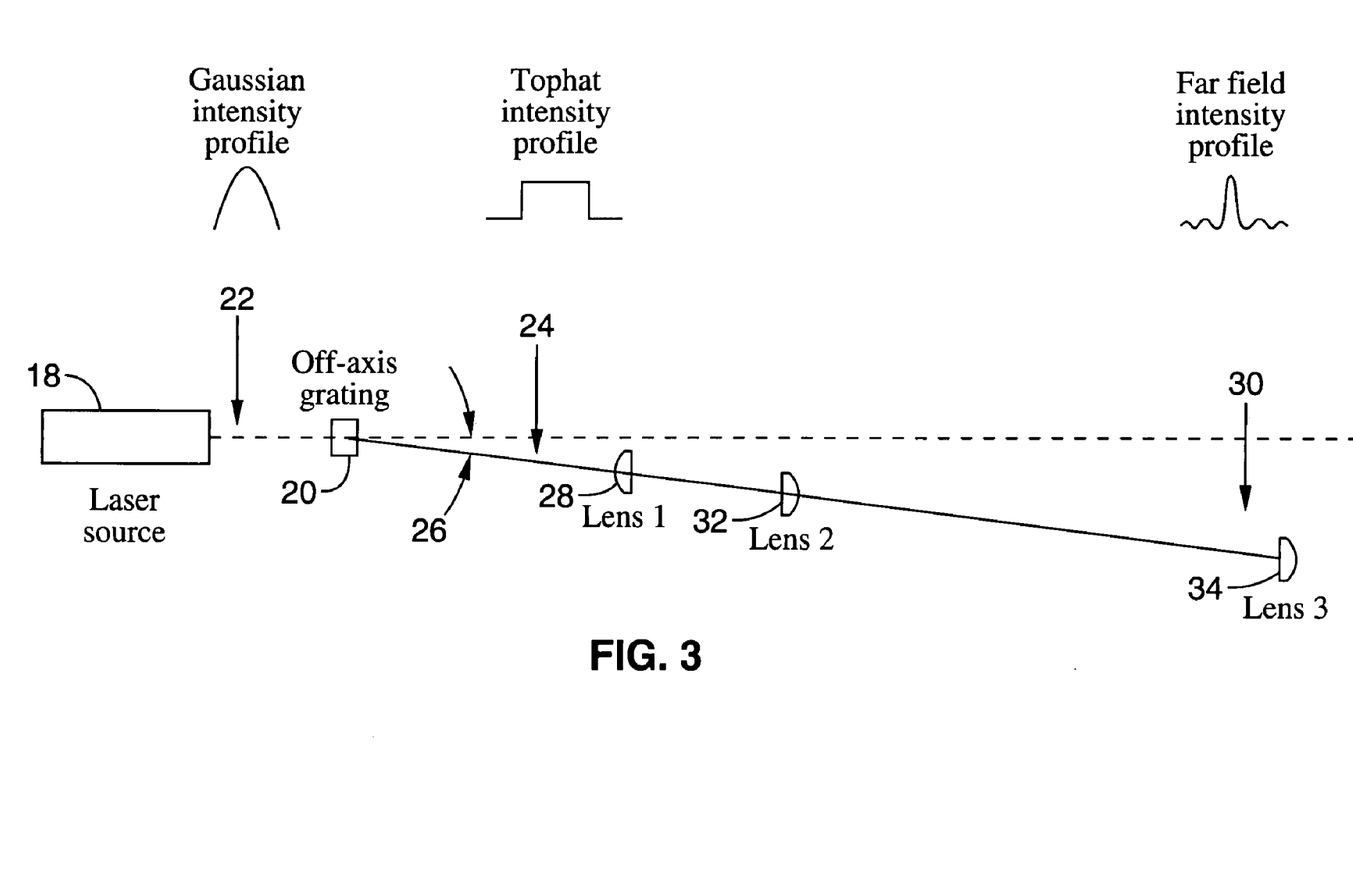
FIG. 3 is a schematic diagram of an apparatus according to the present invention showing a Gaussian beam propagating to a tophat beam and then to a far field intensity pattern for focal plane intensity shaping.
Figure 4:
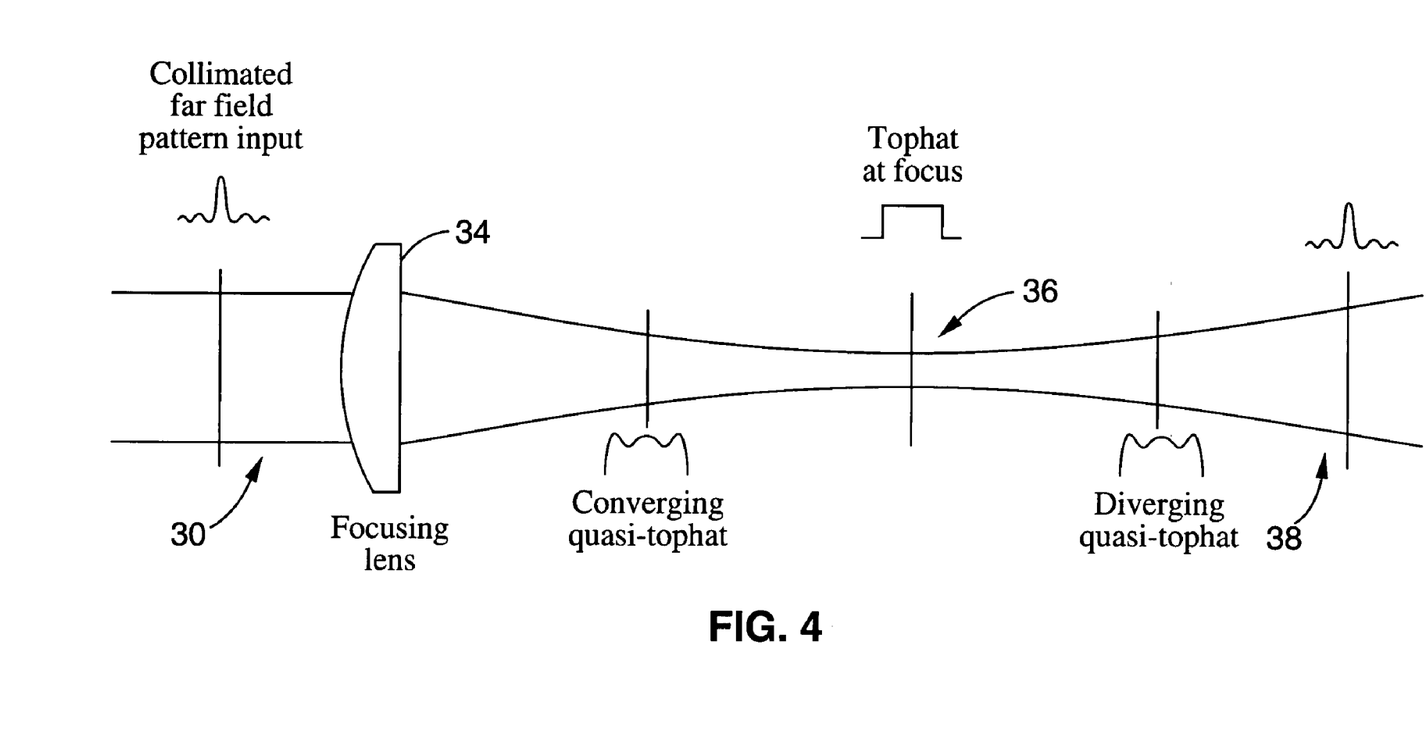
FIG. 4 is a schematic diagram showing the propagation of a collimated far field pattern produced by an apparatus of FIG. 3 through a focusing lens for transformation into a tophat beam.

Referring first to FIG. 3, an apparatus according to the present invention generally comprises a Gaussian laser 18 with a $TEM_{00}$ fundamental mode; an off-axis blazed diffractive phase grating 20 that shapes the Gaussian beam 22 to a beam 24 with a non-Gaussian intensity shape at some small diffracted angle 26 for a single diffraction order, wherein the grating is asymmetric about the optical axis and wherein the grating is further asymmetric about an axis perpendicular to the optical axis; and at least one refractive cylindrical or spherical lens 28 to transform the intensity shape to its far field pattern 30 in one dimension (using a cylinder lens) or two dimensions (using a spherical lens). In FIG. 3, diffractive phase grating 20 is used to shape beam 22 having Gaussian intensity profile into beam 24 having a propagating tophat uniform intensity profile, and then a spherical lens 28 is used to transform the tophat beam 24 into beam 30 having a propagating far field pattern. This technique has a much smaller loss of energy, as compared to the pinhole truncation. If desired, one or more additional lenses 32, which in this example would be a spherical lens, can be employed for increasing the depth of field and beam 30 can be focused with a spherical focusing lens 34 for transformation from a far field pattern to a uniform intensity pattern as shown in FIG. 4. While a pair of lenses 28, 32 are preferred for greater depth of field, satisfactory results can be achieved using only one lens 28.

Referring now to FIG. 4, as indicated above, the far field pattern 30 can be focused with a focusing lens 34 for transformation into a uniform intensity pattern. As can be seen, the result is essentially the reverse of that shown in FIG. 2. Here, as the far field beam 30 propagates past the lens 34, the intensity pattern starts to breakdown into higher frequency lobes. These higher frequency lobes start at the edge of the beam and lose relative intensity while moving towards the center of the beam profile, until they finally converge into the single tophat beam at the focus 36. After the focus, the process begins to reverse and finally restores the far field pattern as the wave front diverges to a large spot diameter 38.

Figures 5, 6, 7:
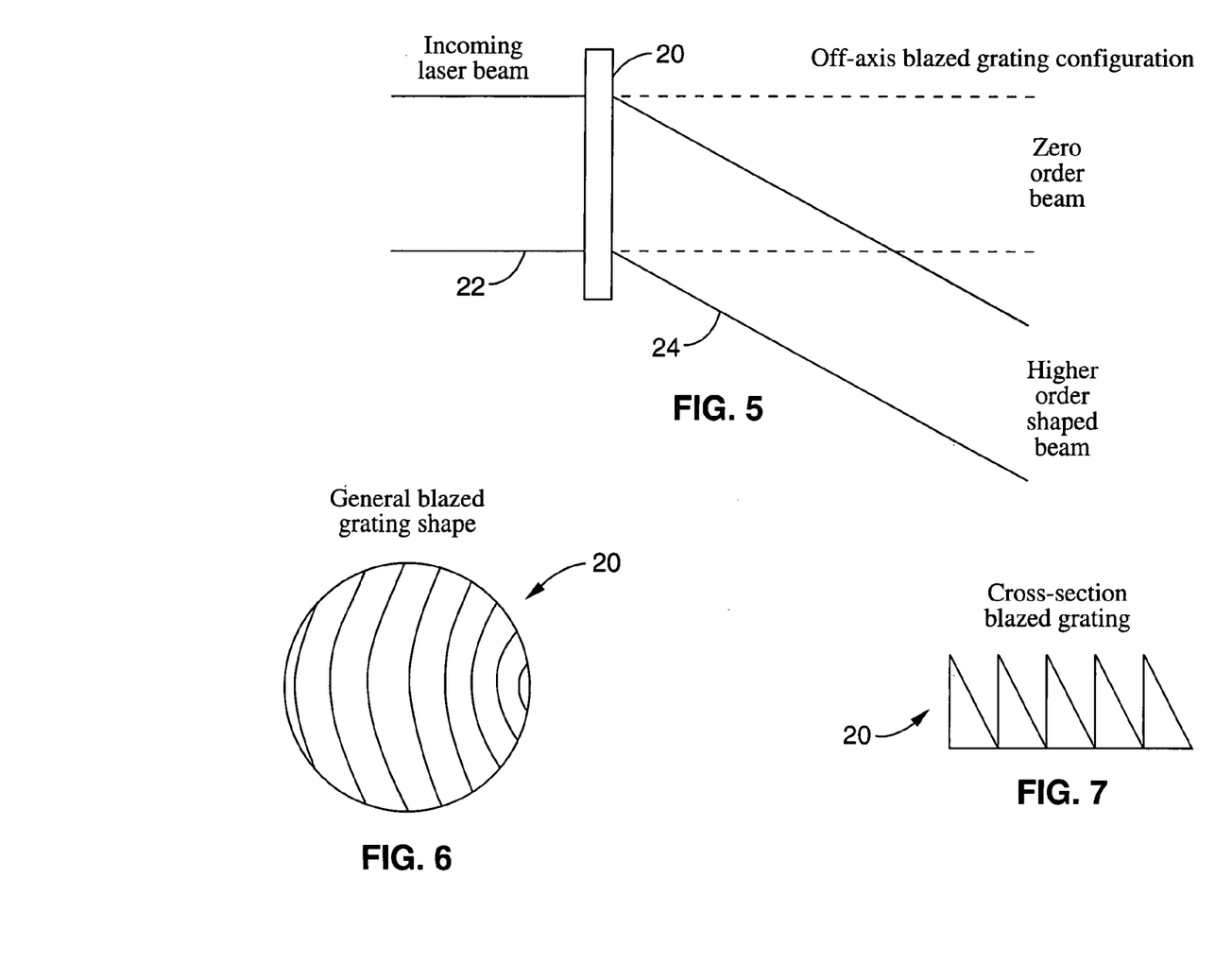
FIG. 5 is a schematic diagram showing details of the off-axis blazed diffraction grating shown in FIG. 3.
FIG. 6 is a schematic plan view of the general shape of the blazed diffraction grating shown in FIG. 3 and FIG. 5.
FIG. 7 is a schematic cross-sectional view of the blazed diffraction grating shown in FIG. 5.

FIG. 5 through FIG. 7 illustrate the diffractive phase grating 20 in more detail. The off-axis blazed grating configuration is important for two distinct reasons. The first reason is that a blazed grating gives a higher diffractive efficiency than the binary two step grating described by Veldkamp. The theoretical efficiency for a blazed grating can be as high as 99%. The second reason is the slight off-axis angle separates out all the diffractive orders horizontally. By separating the diffractive orders, any manufacturing errors in etch depth will not alter the shaped diffracted beam. The on-axis approach to beam shaping allows all the diffractive orders to be superimposed on top of each other and any slight deviation from a perfectly manufactured grating will impact the quality of the shaped beam by other orders interfering with it. The off-axis blazed approach gives higher efficiency and a better quality shaped beam than the binary on-axis approach.

Figure 8:
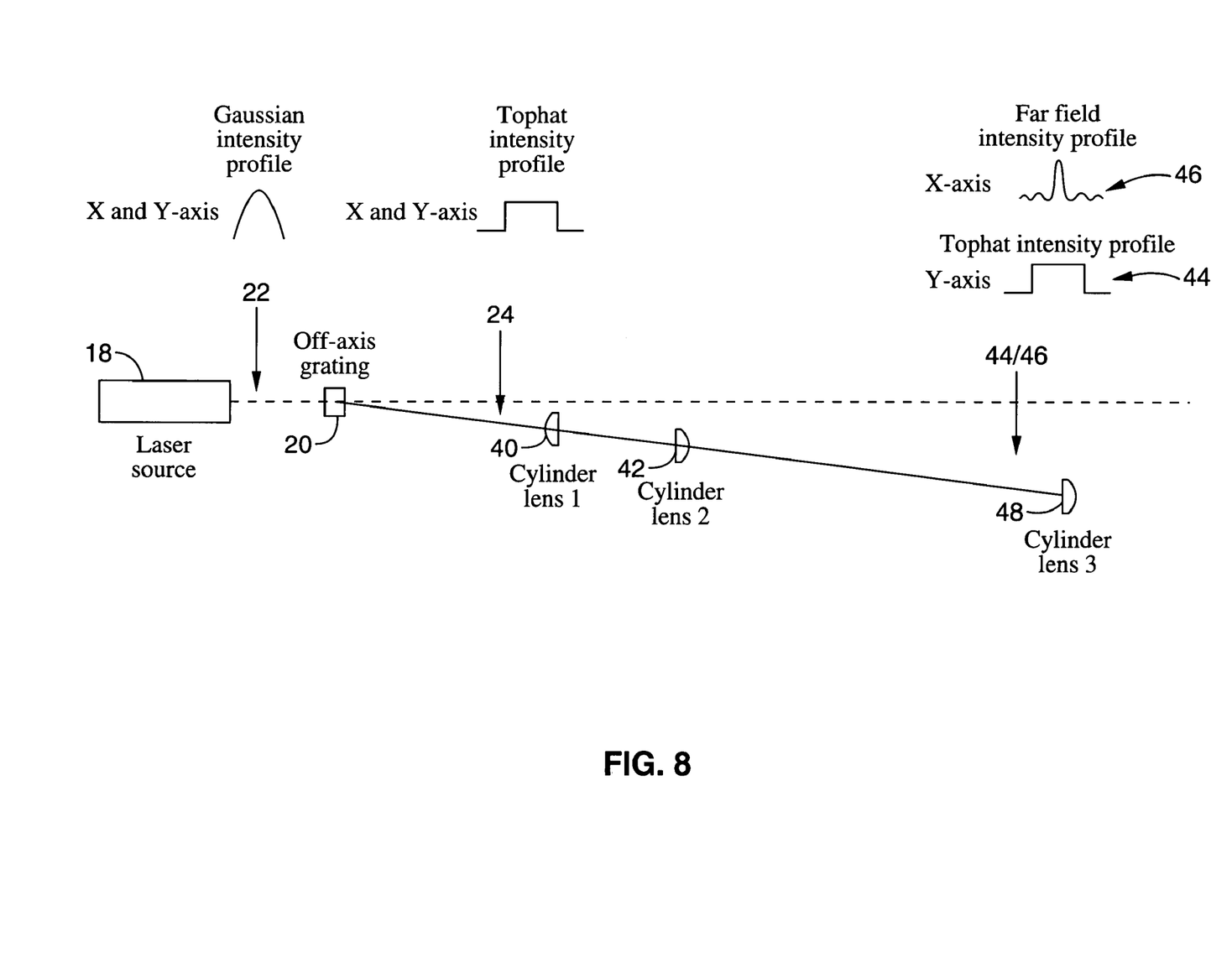
FIG. 8 is a schematic diagram of an alternative embodiment of the apparatus shown in FIG. 3 using cylinder lenses and showing a Gaussian beam propagating to a tophat beam and then to a far field intensity pattern in one axis only for cylinder lens focal plane intensity shaping.

FIG. 8 shows an alternative embodiment of the configuration shown in FIG. 3 where cylinder lenses 40, 42 are used instead of spherical lenses 28, 32. The cylinder lenses allow the designer freedom to transform one axis and leave the other axis unchanged. This type of approach can be useful if a high aspect ratio uniform line is required. Leaving one axis with the uniform intensity profile 44 (e.g., Y axis), the second axis can be shaped to its far field pattern 46, and then a cylinder focusing lens 48 can be used to create a uniform line at the focal plane of the cylinder lens. This technique will be able to create very high aspect ratio line shapes that would be very difficult to create with a spherical optics imaging system.

EXAMPLE 1

A Gaussian intensity profile He—Ne laser (632.8 nm) with a beam diameter of 0.8 mm ($1/e^2$) was positioned adjacent an off-axis near field beam shaper (remapping) single element diffractive optic. A pair of refractive lenses spaced at a distance to produce a slightly converging wave front were positioned downstream of the diffractive optic as shown in FIG. 3. The remapping diffractive optic was designed to produce a 10th order super-Gaussian profile at a beam diameter of 2 mm. This profile was transformed to a far field pattern by the pair of lenses. The configuration produced an intermediate focus between lens 22 and lens 24. Once the system was aligned, the far field pattern was able to propagate for several meters. With this configuration a slightly diverging far field pattern was produced and propagated through a 200 mm focal length lens. The intensity pattern around the focal plane was measured with a CCD camera and digital beam analysis software. The CCD camera had a pixel size of approximately twenty microns. Since this CCD camera was viewing at a focal plane, various beam attenuator configurations were used to make the measurement. Care was taken to ensure that the attenuators did not produce any significant interference patterns in the shaped profiles.

EXAMPLE 2

Consider a propagating far field pattern with a beam diameter of 3 mm (measured to the second null) where its full angle divergence is approximately 3 mrad and its wavelength is 632.8 nm. The calculated $M^2$ is approx 11. Using a 200 mm focal length lens, the expected spot diameter is 0.3 mm. The Rayleigh range for the spot around the focal plane would be 110 mm. Since $Z_R$ only tells us about spot size, we need to bring in more information to describe the intensity profile changes around the focal plane. An example in Gori's work referenced previously (Gori, F. "Flattened Gaussian beams," Opt. Comm. 107, pp. 335–341, 1994) describes a 632.8 nm beam with a $W_o=1$ mm. The $Z_R$ for this beam would be approximately 5 meters; however, Gori shows that the beam profile changes significantly over distances on the order of several hundred millimeters. For his N=25 example, the intensity profile degrades to ±15% uniformity over the flat top in a distance of 400 mm. As a rough estimate for correction, the ratio from $Z_R$ to the ±15% uniformity condition is about 12 to 1. This gives us an estimate of about 9 mm from the focal plane to where the uniform intensity moves above ±15%. Expressed in terms of a uniform depth of field symmetric around the focal plane, the estimate is 18 mm. It should be noted that this example uses a remapping diffractive optic, rather than a diffuser design. The advantage of the remapping approach is that it produces a very uniform beam with minimal high frequency noise and well-defined edges.

EXAMPLE 3

Figure 9:
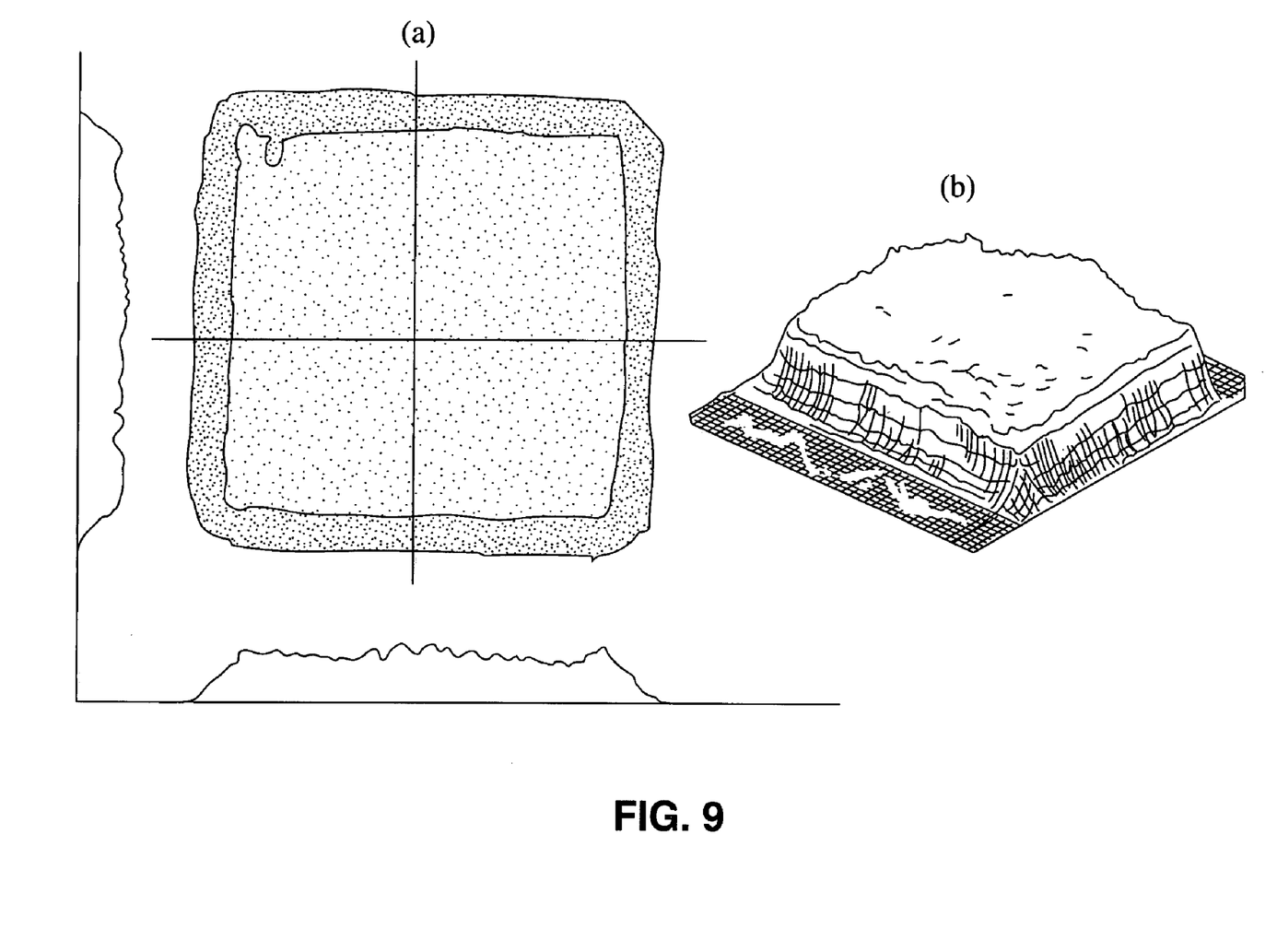
FIG. 9 shows a two-dimensional cross section and three-dimensional view of a square shaped beam profile produced according to the present invention.
Figure 10:
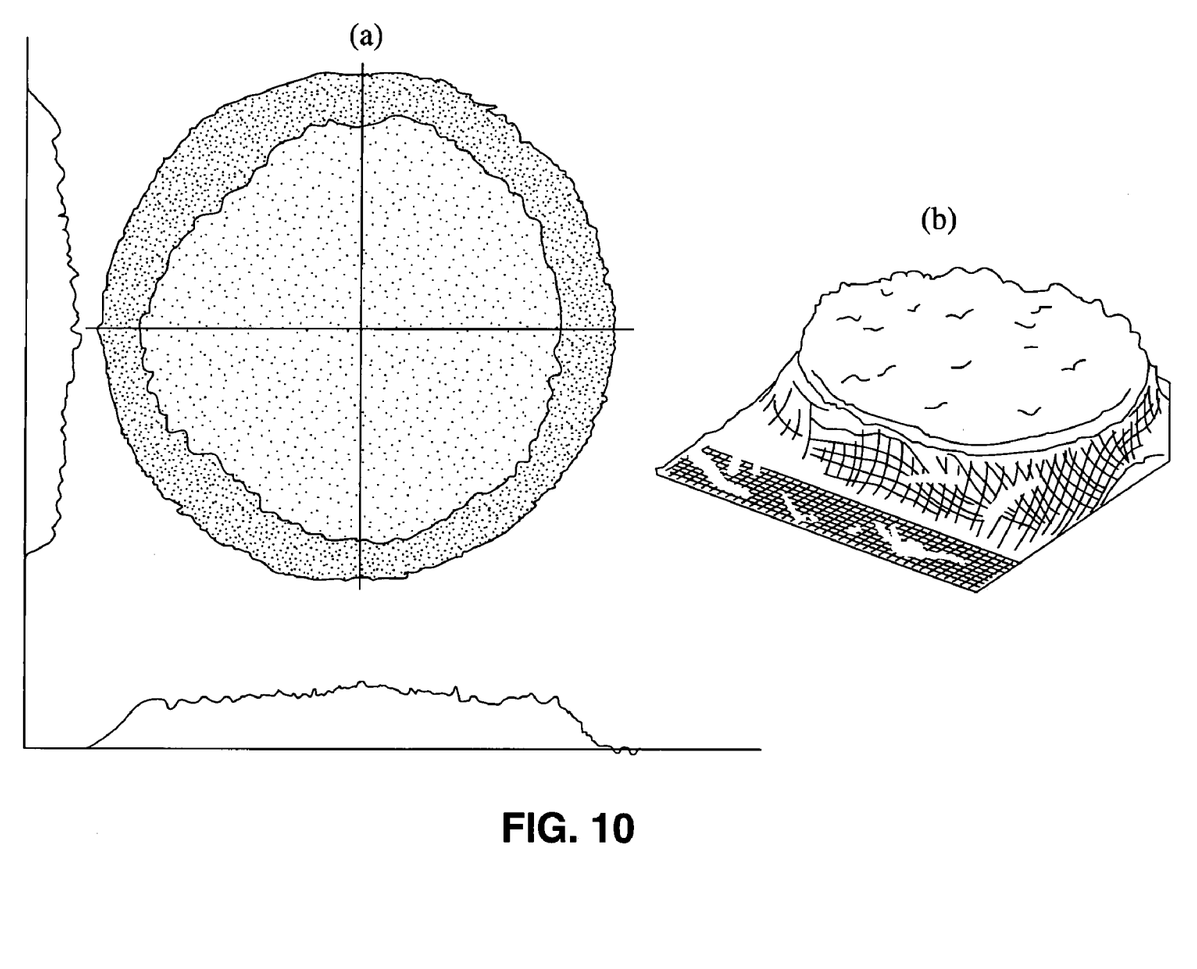
FIG. 10 shows a two-dimensional cross section and three-dimensional view of a round shaped beam profile produced according to the present invention.

Data was taken using both round and square uniform intensity remapping diffractive optics. For both cases, the parameters in the above example are an accurate description. The measured spot diameter at the focal plane was 0.310 mm. This value agrees with the prediction to within 5%. The measured uniform depth of field symmetric around the focal plane was 6 mm. This is a factor of 3 off the prediction, but gives us a rough order of magnitude. One possibility for this difference is that the super-Gaussian in this experiment did not equate well with the example from Gori. If the super-Gaussian used here has a steeper edge slope than Gori's example, the uniformity would degrade more rapidly and this would shorten the uniform depth of field value. Further investigation is needed to conclusively determine this difference. For the case of the square uniform profile, the values were very similar to the round case. The transform pattern for the square uniform profile takes the shape of a cross with a far field spot in the center. FIG. 9(a) and FIG. 10(a) show 2-dimensional beam profiles (in cross section) and FIG. 9(b) and FIG. 10(b) show 3-dimensional beam profiles (FIG. 9(b)) using a diffractive beam shaper remapping optic. The 2-dimensional plots have a cross sectional 1-dimensional plot on the left and bottom. Note that the round beam in FIG. 10(a) and FIG. 10(b) is the near field pattern corresponding to the Airy pattern. The Airy pattern is a particular form of far field pattern. Those skilled in the art will appreciate that the present invention is applicable to far field patterns in general, as well as the specific type of far field pattern referred to as an Airy pattern.

As can be seen, therefore, the present invention comprises a method and apparatus for producing a uniform intensity profile at the focal plane of a lens using a diffractive optic. This method has its foundation in the idea of Fourier transform pairs. With this technique, focal plane shaping of alternative (non-Gaussian) laser beams can be simply understood.

The apparatus and method were tested and the calculations were compared to experimental data. The experimental data was in reasonable agreement with the theory. The theory gives a workable model for designing application that require focal plane intensity shaping. For applications where lasers are used for material processing, a focused uniform intensity profile can improve many existing processes. A well-defined edge on the shaped profile will allow for less taper during typical material processing. As noted earlier, there are several techniques that will produce a propagating far field pattern. In the present invention, however, the diffractive optic can be designed to produce the desired focal plane intensity pattern directly. This intensity can then be inspected for its agreement to the ideal profile without adding the complication of measuring an intensity profile at the focus of a lens. This is a practical matter, as energy densities of typical material processing operations can damage an instrument when placed at the focal plane. A second advantage may be realized when a more complex shape is desired at the focal plane. A uniform round beam is a somewhat rudimentary shape for a diffractive optic to produce. One could imagine wanting to produce a more complex shape, possibly a company logo for laser marking applications. With a complex geometry, the far field or diffraction pattern would not be intuitive. Designing a diffractive optic to convert directly to this diffraction pattern might cause some difficulties when empirical testing is required at the development stage of a new process. Although the experimental results have demonstrated this Fourier transform pairs technique for a uniform, simple geometry, it should work for any intensity pattern that can be generated by a diffractive optic and collimated into a defined beam.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for converting a $TEM_{00}$ mode Gaussian laser beam into a propagating far field diffraction pattern, comprising:

(a) an off-axis blazed diffractive phase grating adapted to shape a Gaussian beam to a non-Gaussian intensity shape at a diffracted angle for a single diffraction order; and (b) at least one refractive lens adapted to transform the intensity shape to a far field pattern;

(c) wherein said grating has an optical axis, wherein said grating is asymmetric about the optical axis, and wherein said grating is asymmetric about an axis that is perpendicular to the optical axis.

2. An apparatus as recited in claim 1, wherein at least one said refractive lens comprises a cylinder lens.

3. An apparatus as recited in claim 2, wherein said cylinder lens transforms the intensity shape to its far field pattern in one dimension.

4. An apparatus as recited in claim 1, wherein at least one said refractive lens comprises a spherical lens.

5. An apparatus as recited in claim 4, wherein said spherical lens transforms the intensity shape to its far field pattern in two dimensions.

6. An apparatus as recited in claim 1, wherein said grating comprises a single element diffractive optic.

7. An apparatus for generating a propagating far field diffraction pattern, comprising:

(a) a Gaussian laser; and (b) means for shaping a $TEM_{00}$ mode beam from said laser to a non-Gaussian intensity shape at a diffracted angle for a single diffraction order and transforming said intensity shape to a far field pattern;

(c) said means comprising an off-axis blazed diffractive phase grating, said grating having an optical axis wherein said grating is asymmetric about said optical axis and wherein said grating is asymmetric about an axis perpendicular to said optical axis.

8. A method for converting a beam from a Gaussian laser into a propagating far field diffraction pattern, comprising:

shaping a $TEM_{00}$ mode beam from a Gaussian laser to a non-Gaussian intensity shape at a diffracted angle for a single diffraction order and transforming said intensity shape to a far field pattern;

wherein said shaping is carried out at least in part by an off-axis blazed diffractive phase grating, wherein said grating has an optical axis, wherein said grating is asymmetric about said optical axis, and wherein said grating is asymmetrical about an axis perpendicular to said optical axis.

9. A method for converting a beam from a Gaussian laser into a propagating far field diffraction pattern, comprising:

(a) shaping a $TEM_{00}$ mode Gaussian laser beam to a non-Gaussian intensity shape at a diffracted angle for a single diffraction order using an off-axis blazed diffractive phase grating; and (b) transforming the intensity shape to a far field pattern using at least one refractive lens;

(c) wherein said grating has an optical axis, wherein said grating is asymmetric about said optical axis, and wherein said grating is asymmetrical about an axis perpendicular to said optical axis.

10. A method as recited in claim 9, wherein at least one said refractive lens comprises a cylinder lens.

11. A method as recited in claim 10, wherein said cylinder lens transforms the intensity shape to its far field pattern in one dimension.

12. A method as recited in claim 9, wherein at least one said refractive lens comprises a spherical lens.

13. A method as recited in claim 12, wherein said spherical lens transforms the intensity shape to its far field pattern in two dimensions.

14. A method as recited in claim 9, wherein said grating comprises a single element diffractive optic.

\* \* \* \* \*